May 14, 1963   B. CONRAD   3,089,191
PRODUCT METHOD AND APPARATUS FOR MAKING
A HOBBED-SURFACED SHEET MATERIAL
Filed June 13, 1961   2 Sheets-Sheet 1
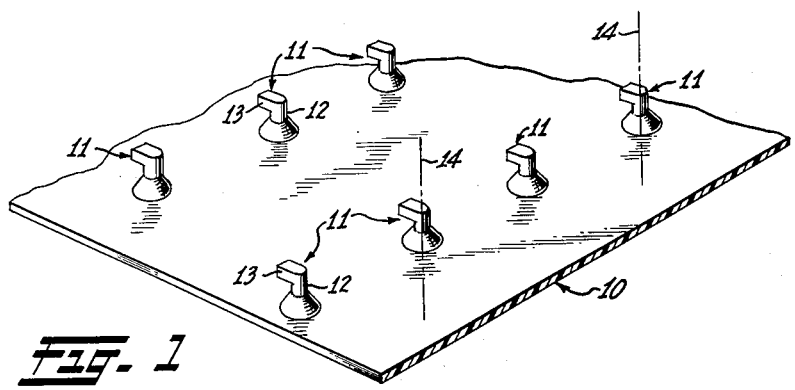
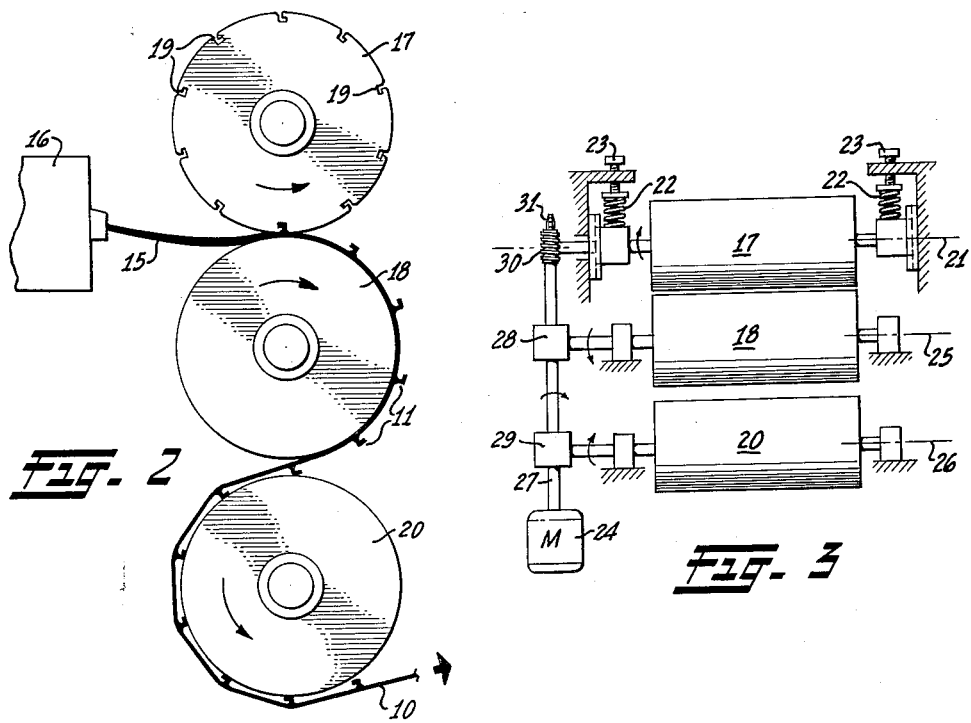
INVENTOR:
BERT CONRAD
BY
Mellin and Hanscom
ATTORNEYS INVENTOR:
BERT CONRAD
BY
Mellin and Hanscom
ATTORNEYS United States Patent Office 3,089,191
Patented May 14, 1963

3,089,191
PRODUCT METHOD AND APPARATUS FOR MAKING A HOBBED-SURFACED SHEET MATERIAL
Bert Conrad, Alhambra, Calif., assignor to American Pipe and Construction Company, South Gate, Calif., a corporation of California
Filed June 13, 1961, Ser. No. 116,851
4 Claims. (Cl. 18—21)

This invention relates to plastic sheet materials which can be cast into concrete structures of all types, including pipes, tanks and foundations. Sheet materials of this kind, such as described in United States Patent No. 2,816,323, serve as a water-proofing agent and also act as a chemical-resistant barrier or lining. More particularly, this invention involves a hobbed-surfaced sheet product that may be economically manufactured by a novel process and unique forms of apparatus.

In brief, this invention contemplates a hobbed-surfaced sheet product made from thermoplastic material that may be extruded from a sheeting die and continuously formed by passing the sheet in a deforamble condition between a die roll and a back-up roll. The die roll is provided with recesses in its peripheral surface, said recesses being arranged in a symmetrical and substantially uniform pattern circumferentially of the roll. A portion of each recess extends angularly and in the same direction about the axis of the die roll's rotation; and being so formed it has been found that by rotating the roll in an opposite angular direction, and by flexing the sheet away from the die roll, the sheet protuberances formed by those recesses may be extracted without being broken off or causing a rupture in the sheet. The success of this operation, and the utility of the product formed thereby, is measurably dependent upon the thermoplasticity and flexibility of the material used.

A primary object of this invention is to provide a novel form of hobbed-surfaced sheet product that may be economically manufactured by a die-rolling process.

Another and more specific object is to provide a hobbed-surface sheet product formed from thermoplastic flexible and liquid-impervious material having a plurality of locking protuberances integrally formed therewith, each protuberance having a projected portion extending outward from a line through said protuberance and normal to said sheet, and each of the projected portions extending in the same direction.

It is a further object of this invention to provide a novel process for economically manufacturing a hobbed-surfaced and flexible sheet product having integrally formed locking protuberances, said process comprising the steps of passing a deformable sheet material between a forming roll and a backing roll, then flexing said material away from the forming roll.

A still further object is to provide novel forms of apparatus for making a hobbed-surfaced sheet from deformable material comprising a forming roll rotatably mounted upon an axis and having recesses in its peripheral surface, said recesses being arranged in a symmetrical and substantially uniform pattern circumferentially of said roll, a portion of each recess extending angularly relative to the axis of said forming roll and in same angular direction, a backing roll rotatably mounted upon an axis parallel to said forming roll, the peripheral surface of said rolls being proximate to each other, means urging said rolls toward each other, and means for rotating said rolls in opposite angular directions, said forming roll being rotated in a direction opposite to the angular direction of recess extensions.

Other objects of this invention will become apparent in view of the drawings and the following detailed description.

In the drawings forming a part of this application and in which like parts are identified by like reference numerals throughout the same, FIG. 1 is a perspective view of a preferred embodiment of hobbed-surfaced sheet product made in accordance with the concept and teaching of this invention;

FIG. 2 is a diagrammatic illustration of a preferred form of apparatus for making the product of FIG. 1;

FIG. 3 is another diagrammatic illustration showing the manner for supporting and operating the forming roll, backing roll, and flexing roll of FIG. 2;

Figure 5:
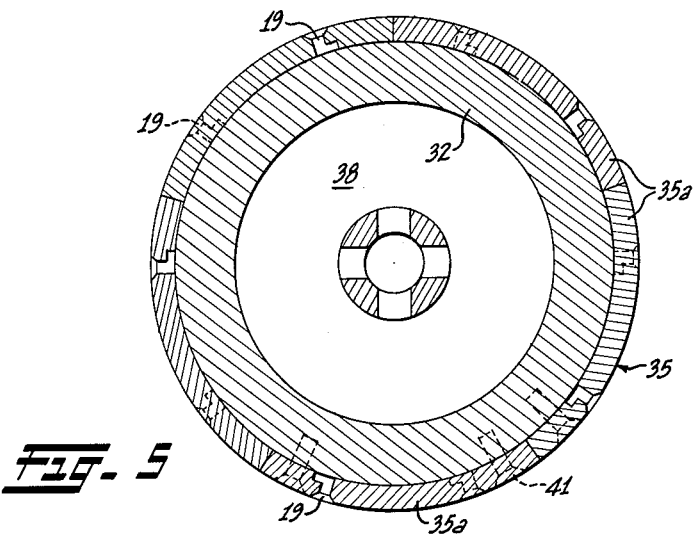
FIG. 5 is a transverse section of the forming roll, taken on lines 5—5 of FIG. 4.

Referring to FIG. 1, there is illustrated a preferred form of product as contemplated by this invention and comprising a flexible sheet 10 having a plurality of symmetrically arranged and integrally formed locking protuberances 11 on one surface thereof. Each protuberance comprises a stem portion 12 and a foot protuberance comprises a stem portion 12 and a foot portion 13, said stem portions having axes 14 substantially normal to the sheet and said foot portions projecting in a common direction and normal to their respective stem axes. This product is formed of a thermoplastic material that is corrosive-resistant and liquid-impervious, and may be utilized as a liner in concrete products as previously explained. It will be especially noted that the stem portions 12 define conical frustums having their base end integrally formed and coplanar with sheet 10. This shape is of particular importance and benefit in strengthening the integral connection between the protuberances and sheet 10, allowing the product to be more easily and economically manufactured in the manner and with the apparatus shown in FIGS. 2–6. Furthermore, it is to be understood that the flexibility of the sheet and its deformable nature are important qualities in carrying out the process of manufacture hereinafter described.

FIGS. 2–6 of the drawings clearly illustrate the novel processes and apparatus for manufacturing the product of FIG. 1. A sheet of thermoplastic material 15 is initially extruded from a standard plastics extruder and sheeting die 16. The material, being in a very plastic state, is then passed between a fluid-cooled forming roll 17 and a backing roll 18. Roll 17 is provided with a plurality of die recesses 19 that are arranged in a symmetrical and substantially uniform pattern circumferentially of said roll; and each recess defines the shape of the sheet protuberances that are to be formed. It will be seen that a portion of each recess extends angularly relative to the axis of forming roll rotation, and further, all recess portions project in the same direction. As the material 15 passes between rolls 17 and 18 it is compressed and forced into the die recesses, the sheet material being reduced to a controlled thickness. Once the material fills the recesses it is thermally set by the fluid-cooled nature of roll 17, thereby changing the thermoplastic material from a state of high fluid-like plasticity to one of rigidified flexibility. Thus, as the sheet of thermoplastic material emerges from between rolls 17 and 18 it has been transformed to the form of product intended and may be flexed backward away from the forming roll 17 and against the backing roll 18 without distorting the shape of the sheet 10 or its protuberances 11. Furthermore, and most importantly, in view of the directional character of protuberances 11 and their die recesses 19, the hobbed-surfaced sheet that is being formed may be rolled backward upon itself, causing a torque to be applied to each protuberance and inducing each to be turned and extracted from its respective recess without rupturing. A flexing roll 20 having a peripheral surface adjacent roll 18, and being disposed on the opposite side of roll 18 from roll 17, holds sheet 10 against the backing roll while flexing said sheet away from the forming roll.

Rolls 17, 18 and 19 may be mounted and arranged in the manner shown in FIG. 3. Forming roll 17 is preferably mounted upon a vertically floating axis 21 having spring biasing means 22 that urge said roll toward backing roll 18. The force of spring biasing means 22 may be controlled by adjusting screws 23.

It is to be understood that the amount of force to be applied by the biasing means 22 and the peripheral take-off speed of the forming roll will depend upon the plasticity of the material, the thickness of the sheet product to be formed, the size and shape of the die cavities and other obvious factors well known in the art of plastic extrusion.

The extruded thermoplastic sheet material 15 may be made from numerous well-known extrudable substances including vinyl chloride, vinylidene chloride, styrene, polyethylene and polypropylene. In some cases, a plasticizer will be required, while in others the sheet may be formed from the straight resin. For example, a plasticizer is preferably incorporated in a sheet of polyvinyl chloride to give it the required degree of flexibility.

Each of the rolls 17, 18 and 19 have the same peripheral take-off speed and may be driven by a common power source, such as motor 24. Backing roll 18 and flexing roll 20 are mounted upon fixed axes 25 and 26, respectively, and are driven by a main drive shaft 27 through reduction gear boxes 28 and 29, respectively. Forming roll 17 is driven off the main drive shaft 27 through its separate worm gear 30 and pinion 31.

Figure 4:
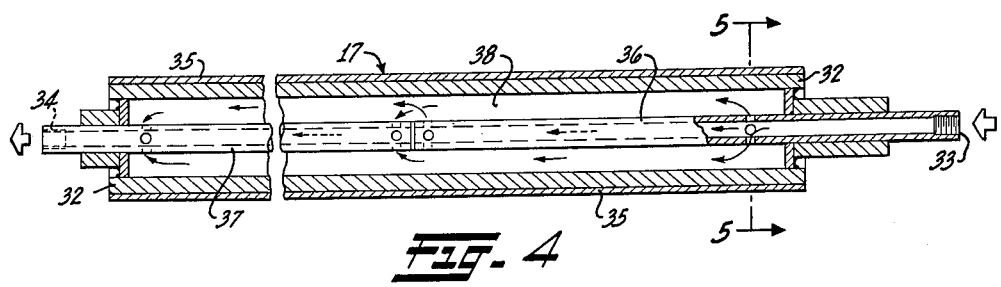
FIG. 4 is a vertical center section of a fluid-cooled forming roll as contemplated to be used in connection with this invention.
Figure 6:
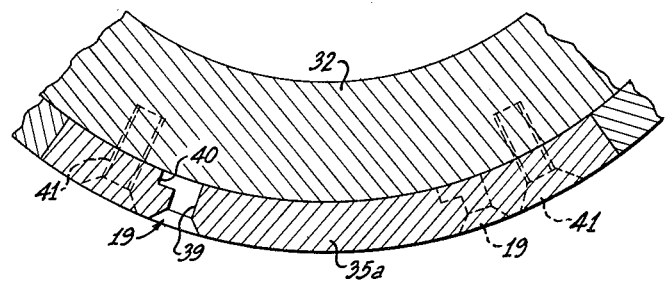
FIG. 6 is an enlarged detail and section of the bottom portion of the forming roll as shown in FIG. 5.

FIGS. 4–6 illustrate a novel and preferred construction for forming roll 17, comprised of a fluid-cooled roll cylinder 32 having axial fluid inlet and outlet openings 33 and 34, respectively, and an axially segmented outer die cylinder 35 formed of strip sections 35a. The fluid-cooled roll cylinder 32 may be of conventional construction having coaxial interior pipe members 36 and 37 for transmitting a cooling medium into and from a coolant chamber 38. It will be apparent that pipe members 36 and 37 are not coaxially continuous but have radial openings in fluid communication with chamber 38.

The die cylinder segments 35a are provided with a plurality of openings 39 therethrough, each opening terminating in a slotted recess 40 on the inner surface extending angularly relative to the roll axis. The segments 35a are individually attached to the outer peripheral surface of cylinder 32 by a plurality of cap screws 41, the outer surface of said cylinder covering each opening 39 and recess 40 and defining an internal die cavity having an opening to the outer peripheral surface of the segments. Openings 39 are enlarged at the outer surface of the die cylinder 35 to enhance removal of the protuberances as well as to provide an enlargement of the stem portions 12, thereby strengthening their integral connection to sheet 10. This construction provides a simple yet effective manner for making the forming roll 17.

It is to be understood that the form of the invention herewith shown and described is to be taken as a preferred example thereof, and that various changes may be made in the shape, size and arrangement of certain parts without departing from the spirit of the invention or the scope of the attached claims, and each of such changes is contemplated.

Having thus described my invention, what I claim and desire to secure by Letters Patent is:

1. An apparatus for making a hobbed-surfaced sheet from deformable and extrudable material, a forming roll comprising: a fluid-cooled roll cylinder having axial fluid inlet and outlet openings, an axially segmented die cylinder coaxially mounted to said roll cylinder and having its inner cylindrical surface secured in abutting relationship to the outer cylindrical surface of said roll cylinder, said die cylinder having a plurality of openings therethrough, each opening terminating in a slotted recess on the inner surface of said die cylinder, each recess extending angularly relative to the axis of said roll and die cylinders and in the same angular direction, the outer surface of said roll cylinder covering each recess and defining an internal cavity having an opening to the outer surface of said die cylinder.

2. The forming roll of claim 1 wherein each opening is enlarged at the outer surface of said die cylinder.

3. An apparatus for making a hobbed-surfaced sheet from deformable and extrudable material, a forming roll comprising: a roll cylinder, a die cylinder coaxially mounted to said roll cylinder and having its inner cylindrical surface secured in abutting relationship to the outer cylindrical surface of said roll cylinder, said die cylinder having a plurality of openings therethrough, each opening terminating in a recess on the inner surface of said die cylinder and each recess extending angularly relative to the axis of said roll and die cylinders and in the same angular direction, the outer surface of said roll cylinder covering each recess and defining an internal cavity having an opening in the outer surface of said die cylinder, and fluid means within said roll cylinder for thermally setting extruded material that is lodged within internal cavities.

4. An apparatus for making a hobbed-surfaced sheet from deformable and extrudable material, a forming roll comprising: a roll cylinder, a die cylinder coaxially mounted to said roll cylinder and having its inner cylindrical surface secured in abutting relationship to the outer cylindrical surface of said roll cylinder, said die cylinder having a plurality of openings therethrough, each opening terminating in an enlarged internal cavity extending angularly relative to the axis of said roll and die cylinders and in the same angular direction, surface portions of said roll cylinder and die cylinder defining each of said internal cavities, and fluid means within said roll cylinder for thermally setting extruded material that is lodged within said cavities.

References Cited in the file of this patent

UNITED STATES PATENTS

| | | |
|---|---|---|
| 303,804 | Cable | Aug. 19, 1884 |
| 768,129 | Kempshall | Aug. 23, 1904 |
| 1,721,549 | Eaton | July 23, 1929 |
| 1,954,635 | Leonard | Apr. 10, 1934 |
| 1,988,787 | Fowler | Jan. 22, 1935 |
| 2,323,862 | Zimmerman et al. | July 6, 1943 |
| 2,598,866 | Warp | June 3, 1952 |
| 2,776,452 | Chavannes | Jan. 8, 1957 |
| 2,786,233 | Merrill | Mar. 26, 1957 |
| 2,791,801 | Szantay | May 14, 1957 |
| 2,801,439 | Meares | Aug. 6, 1957 |

FOREIGN PATENTS

| | | |
|---|---|---|
| 419,189 | Italy | Mar. 17, 1947 |
| 1,085,450 | Germany | July 14, 1960 |